(12) United States Patent
Veditz (10) Patent No.: US 7,478,142 B1
(45) Date of Patent: Jan. 13, 2009

(54) SELF-CONTAINED APPLICATIONS THAT ARE APPLIED TO BE RECEIVED BY AND PROCESSED WITHIN A BROWSER ENVIRONMENT AND THAT HAVE A FIRST PACKAGE THAT INCLUDES A MANIFEST FILE AND AN ARCHIVE OF FILES INCLUDING A MARKUP LANGUAGE FILE AND SECOND PACKAGE

(75) Inventor: Daniel P. Veditz, Felton, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/163,041

(22) Filed: Sep. 29, 1998

(51) Int. Cl.
*G06F 15/16* (2006.01)
(52) U.S. Cl. ................................................ 709/218
(58) Field of Classification Search ............... 709/201, 709/202, 219, 249, 218; 717/121, 162, 172, 717/177
See application file for complete search history.

(56) References Cited

U.S. PATENT DOCUMENTS

| | | | | |
|---|---|---|---|---|
| 5,617,526 A | * | 4/1997 | Oran et al. ................... 715/779 |
| 5,727,156 A | | 3/1998 | Herr-Hoyman et al. ..... 709/219 |
| 5,790,793 A | | 8/1998 | Higley ......................... 709/218 |
| 5,799,285 A | | 8/1998 | Klingman ...................... 705/26 |
| 5,805,804 A | * | 9/1998 | Laursen et al. |
| 5,870,559 A | | 2/1999 | Leshem et al. .............. 709/224 |
| 5,870,767 A | | 2/1999 | Kraft, IV .................. 707/501.1 |
| 5,877,766 A | * | 3/1999 | Bates et al. ................... 715/854 |
| 5,893,127 A | | 4/1999 | Tyan et al. ................... 707/513 |
| 5,905,248 A | | 5/1999 | Russell et al. ........... 235/462.15 |
| 5,913,215 A | | 6/1999 | Rubinstein et al. ............ 707/10 |
| 5,944,783 A | * | 8/1999 | Nieten ......................... 709/202 |
| 5,946,464 A | * | 8/1999 | Kito et al. ................... 709/202 |
| 5,964,836 A | * | 10/1999 | Rowe et al. .................. 709/221 |
| 5,968,116 A | * | 10/1999 | Day, II et al. ............... 709/202 |
| 5,974,441 A | * | 10/1999 | Rogers et al. |
| 5,974,454 A | * | 10/1999 | Apfel et al. |
| 5,983,233 A | * | 11/1999 | Potonniee |
| 5,999,940 A | * | 12/1999 | Ranger |
| 6,009,456 A | * | 12/1999 | Frew et al. ................... 709/202 |

(Continued)

OTHER PUBLICATIONS

R. Englander, "Developing Java Beans", Book Overview Section, p. 1, O'Reilly, Jun. 1997.*

(Continued)

*Primary Examiner*—Andrew Caldwell
*Assistant Examiner*—John M MacIlwinen
(74) *Attorney, Agent, or Firm*—Fish & Richardson P.C.

(57) ABSTRACT

An implementation of a self-contained application may be distributed and automatically executed within a network client environment, such as within a web browser environment. The implementation of the self-contained application includes a first package that includes a manifest and an archive of files. The archive of files includes a markup language file that is the initial file to be processed and that includes instructions for initiating execution of the application. In the implementation, the archive of files also includes other files needed to execute the application and a second package that may be of the same type as the first package. The manifest file includes an initial file identifier that instructs the application to process the markup language initial file before processing the other files.

42 Claims, 6 Drawing Sheets

U.S. PATENT DOCUMENTS

| | | | |
|---|---|---|---|
| 6,029,175 A * | 2/2000 | Chow et al. | |
| 6,041,342 A * | 3/2000 | Yamaguchi | 709/202 |
| 6,047,323 A * | 4/2000 | Krause | |
| 6,049,819 A * | 4/2000 | Buckle et al. | 709/202 |
| 6,052,531 A * | 4/2000 | Waldin et al. | 717/170 |
| 6,065,024 A * | 5/2000 | Renshaw | 715/513 |
| 6,092,178 A * | 7/2000 | Jindal et al. | |
| 6,112,023 A * | 8/2000 | Dave et al. | |
| 6,115,040 A * | 9/2000 | Bladow et al. | 715/741 |
| 6,202,207 B1 * | 3/2001 | Donohue | |
| 6,216,212 B1 * | 4/2001 | Challenger et al. | |
| 6,314,565 B1 * | 11/2001 | Kenner et al. | |
| 6,347,398 B1 * | 2/2002 | Parthasarathy et al. | |
| 6,351,816 B1 * | 2/2002 | Mueller et al. | 713/176 |
| 6,385,643 B1 * | 5/2002 | Jacobs et al. | 709/203 |
| 6,397,220 B1 * | 5/2002 | Deisinger et al. | 707/102 |
| 6,430,739 B1 * | 8/2002 | Ballard | 717/100 |
| 6,587,836 B1 * | 7/2003 | Ahlberg et al. | 705/26 |
| 6,623,527 B1 * | 9/2003 | Hamzy | 715/513 |
| 6,839,733 B1 * | 1/2005 | Lange et al. | 709/202 |
| 2001/0029605 A1 * | 10/2001 | Forbes et al. | 717/11 |

OTHER PUBLICATIONS

R. Englander, "Developing Java Beans", Section 6.1, pp. 1-2, O'Reilly, Jun. 1997.*

R. Englander, "Developing Java Beans", Section 6.2, pp. 1-3, O'Reilly, Jun. 1997.*

R. Englander, "Developing Java Beans", Section 6.3, p. 1, O'Reilly, Jun. 1997.*

R. Englander, "Developing Java Beans", Section 6.4, p. 1, O'Reilly, Jun. 1997.*

R. Englander, "Developing Java Beans", Section 6.5, p. 1, O'Reilly, Jun. 1997.*

R. Englander, "Developing Java Beans", Section 1.2.2, pp. 1-2, O'Reilly, Jun. 1997.*

Netscape Smartupdate (Press Release 1). http://wp.netscape.com/newsref/pr/newsrelease461.html. Aug. 18, 1997. pp. 1-3.*

Netscape Smartupdate (Press Release 2). http://cgi.netscape.com/newsref/pr/newsrelease523.html. Nov. 3, 1997. pp. 1-3.*

Netscape Smartupdate Jar Support. microsoft.public.inetexplorer.ie4.java_applets. Andrew Spyker. http://groups.google.com/group/mircosoft.public.inetexplorer.ie4.java_applets/browse_thread/thread/2ebc647eee3b4cb7/dfe3e90a4a55e6e0?lnk=st&q=locally+install+java+applet+support#dfe3e90a4a55e6e0. Sep. 25, 1997. pp. 1-2.*

Nesting CAB Files. microsoft.public.java.cab. http://groups.google.com/group/microsoft.public.java.cab/browse_thread/thread/5c7c5a123e14dec8/4eb1530cd9d33b01?lnk=st&q=create+cab+within+cab#. Mar. 6-25, 1998. pp. 1-7.*

"JAR File Format" retrieved via the Internet and World-Wide-Web at http://java.sun.com/docs/books/tutorial/post1.0/whatnew/jar.html on Sep. 22, 1998 at 1:55pm, p. 1 of 1.

"The Java Archive (JAR) File Format" retrieved via the Internet and World-Wide-Web at http://java.sun.com/docs/books/tutorial/jar/index.html on Sep. 22, 1998 at 1:55pm, pp. 1-2.

"Using JAR Files: The Basics" retrieved via the Internet and World-Wide-Web at http://java.sun.com/docs/books/tutorial/jar/basics/index.html on Sep. 22, 1998n at 1:56 pm, pp. 1-2..

"Modifying a Manifest File" retrieved via the Internet and World-Wide-Web at http://java.sun.com/docs/books/tutorial/jar/basics/mod.html on Sep. 22, 1998 at 1:56 pm, pp. 1-3.

"Understanding the Manifest" retrieved via the Internet and World-wide-Web at http://java.sun.com/docs/books/tutorial/jar/basics/manifest.html on Sep. 22, 1998 at 1:58pm, pp. 1-4.

"Manifest Format" retrieved via the Internet and World-Wide-Web at http://java.sun.com/products/jdk/1.2/docs/guide/jar/manifest.html on Sep. 22, 1998 at 2:12pm, pp. 1-7.

"JAR file (Java Archive file)" retrieved via the Internet and World-Wide-Web at http://whatis.com/jar.htm on Sep. 22, 1998 at 2:13pm, p. 1 of 1.

* cited by examiner

Manifest-Version: 1.0
Author: Jane Doe
Version: 1.0
Date: 11/09/97
Copyright: (C) 1997 MySite.com All Rights Reserved archive-type: WebApp
Initial-File: index.html Name: index.html
Content-type: text/html
<HTML - FOR WEB-BASED APPLICATION>
Name: components/MyComponent.JAR
Content-type: application/java-archive Name: components/MyOtherComponent.JAR
Content-type: application/java-archive

Manifest-Version: 1.0
Author: Jane Doe
Version: 1.0
Date: 11/09/97
Copyright: (C) 1997 MySite.com All Rights Reserved

SELF-CONTAINED APPLICATIONS THAT ARE APPLIED TO BE RECEIVED BY AND PROCESSED WITHIN A BROWSER ENVIRONMENT AND THAT HAVE A FIRST PACKAGE THAT INCLUDES A MANIFEST FILE AND AN ARCHIVE OF FILES INCLUDING A MARKUP LANGUAGE FILE AND SECOND PACKAGE

BACKGROUND OF THE INVENTION

1. Field of the Invention

The present invention relates to applications such as web-based applications (software systems) which are intended to be executed and manifested within a network client such as within a world wide web (WWW) browser environment.

2. Description of the Related Art

Network clients such as world wide web (WWW) enabled browsers are well known. In fact, browsers have become so widely used, that millions of people rely on the same to carry out their normal affairs. For example, consumers can now access the Internet to make travel arrangements, buy household items, and even trade securities such as stocks and bonds online. Also, users within organizations can access company web sites via internal networks commonly referred to as "intranets" to learn about company events, complete expense reports, exchange project information, etc. As a result, the browser has become almost a staple part of the way people use their computers to generate and receive information.

Although the browser network client, as a tool, has become very powerful and popular in terms of its inherent ability access server systems to receive content therefrom, the browser still remains limited in the functionality it can provide or allow. That is, browsers are designed to access remote server systems (computers) and receive content therefrom instead of providing stand-alone functionality. In other words, although capable of loading files and processing the same from local storage facilitates, they are targeted at accessing remote systems, receiving rich content, and providing a "current" web site experience. To date, browsers have not been utilized as general interfaces to facilitate general computing functionality that has traditionally been provided by stand-alone native applications and executable programs (e.g., form filling applications, etc.).

The aforementioned comments are not to be taken to indicate that developers have not created feature rich applications to operate within browser environments. To the contrary, many developers have created elaborate applications written as JAVA applications or "applets," for example, and have distributed the same for execution within a browser network client. Typically, however, such applets are executed within a processing space (e.g., within a window) inside of a browser environment to deliver a particular feature set. Unfortunately, such applets are also intended to be distributed from a server system via a network connection and merely form part of a larger web site environment which usually includes content of various types including, but not limited to, hyper-text content (i.e., hyper-text markup language (HTML) content), images, sound files, JAVA, JAVA Script, etc.

Despite the inherent ability of a browser to access server systems and receive and manifest feature rich content (e.g., such as that provided via JAVA, etc.), browsers continue to remain under-utilized. Such under-utilization also is due, in large part, to the fact that there is no current, effective and efficient way to package content and distribute the same via network connection, physical passage (e.g., via computer-readable media such as compact discs, etc.). There is no current way for developers to package all content that may be related to a particular web-based application (e.g., one that would normally be served to a browser from a remote server system in the context of a web site, for example) and to distribute the same in an effective and efficient manner. For example, many people utilize open-standards based tools (e.g., HTML, etc.) to produce presentations, documentation sets, etc. which often include whole collections of files, images, etc. Save for successfully storing all such files in a commonly accessible directory, there is no way for a person to package all such files and make the same available or distribute such a package to client systems equipped with browsers. As such, there is no current way for a complete web-based application to be packaged for automatic processing within a browser environment and without the need for server (URL) distribution.

To address the aforementioned problems, developers have proposed several solutions which have not heretofore effectively allowed people to encapsulate complete web-based applications such as web sites. For example, many developers have developed file archiving formats to produce archive files containing all files related to a particular web application. Unfortunately, such currently available archiving schemes are not directed to the needs of a web-based application; that is, they are not directed to including the actual content necessary for a browser to render or layout web based data—e.g., HTML, etc. Moreover, such archiving schemes are not suited to produce auto-executable or auto-processable files within a browser environment—for example, there is no way to identify a starting file to cause a browser to instantly and automatically load and render a web-based application. And, despite their ability to encapsulate files, such currently available archiving schemes have no ability to provide a stand-alone file that may reside next to a native application and which may be treated within an operating environment as one in the same.

Thus, there exists a need to allow web based application (e.g., those normally associated with a WWW site, etc.) to be encapsulated within a standard file structure, distributed via any form of data distribution, and which may be automatically executed within a browser environment without having to cause to the browser environment to access a remote server system for files forming part of the web based application. Accordingly, there exists a need to provide new and improved systems and methods for encapsulating a web-based application into an open-standards based file format and structure which may be processed by a correspondingly equipped network client or web browser. To be viable, such a system and method of encapsulation must be easy to use.

SUMMARY OF THE INVENTION

The present invention solves the aforementioned problems and, in so doing, provides certain benefits not heretofore realized with other network clients and software packaging schemes. In particular, the present invention provides a software component packaging scheme and corresponding network client that facilitates the receipt and processing of self-contained software systems (e.g., web sites, web-based applications, etc.) without requiring network access, etc. The present invention will allow developers and users to package whole collections of open-standards based content (e.g., all content associated with a web site, etc.) and to distribute the same to users who may access the same as though they were native, executable applications. Accordingly, the present invention extends the functionality of current-day web browsers beyond that of network content access tool to allow the same to be considered as application processing environments capable of rich content manifestation, etc. Developers can utilize the present invention to deliver applications based on open-standards without having to be concerned with screen layout, content rendering, and other infrastructure issues which normally must be dealt with when developing stand-alone, native applications. Users will benefit from the present invention by becoming accustomed to a standard application processing environment in which many, if not all, of their applications are executed and run. And, users who are not otherwise connected or coupled to a network server (e.g., users of disconnected laptop computers, etc.) can now receive whole web-based applications and run the same like native applications without having to login into or access a remote server system.

The present invention solves the aforementioned problems and provides the above-described benefits by providing new and improved systems and methods for producing and processing self-contained software systems. In particular the present invention provides a self-contained software package that is adapted to be automatically processed within a browser environment. The self-contained software package includes, but is not limited to, a manifest containing meta-data about the self-contained software package, and at least one reference to an initial content source. The initial content source includes instructions related to a particular intended functionality such as that corresponding to a web site, open-standards application, etc. The manifest and reference(s) to the initial content source are adapted to be automatically received by and processed within a network client environment (e.g., within a world wide web—WWW browser). The initial content source is configured to control the network client environment in accordance with the instructions to achieve the intended functionality.

According to another aspect of the present invention, provided is a web browser adapted to receive and process a self-contained software package. The web browser includes an input module for inputting a manifest containing meta-data about the self-contained software package, and at least one reference to an initial content source. The initial content source includes instructions related to a particular intended functionality such as that provided at or by a web site or by a web based/open standards application, etc. The manifest and reference(s) to the initial content source are automatically received by and processed within the web browser. The initial content source controls the web browser in accordance with the instructions to achieve the particular intended functionality.

According to another aspect of the present invention, provided is a method for generating and automatically processing a self-contained software package within a web browser environment. The method includes the steps of generating a manifest containing meta-data about the self-contained software package, generating at least one reference to an initial content source that includes instructions related to a particular intended functionality, automatically receiving the manifest, the reference(s), and the initial content source, and automatically processing the manifest, the reference(s), and the initial content source within the browser environment. The initial content source controls the browser environment in accordance with the instructions to achieve the particular intended functionality.

According to another aspect of the present invention, provided is a method of using a web browser that includes the steps of receiving a manifest containing meta-data about a self-contained software package, receiving at least one reference to an initial content source that further includes instructions related to a particular intended functionality, and automatically processing the manifest, the reference(s), and the initial content source within a web browser environment. The initial content source controls the browser environment in accordance with the instructions to achieve the particular intended functionality.

BRIEF DESCRIPTION OF THE DRAWINGS

The present invention is discussed in detail below with regard to the drawing figures attached hereto, of which.

DETAILED DESCRIPTION OF THE PREFERRED EMBODIMENTS

The present invention is now discussed in detail with regard to the drawing figures that were briefly described above. Unless otherwise indicated, like parts and processes are referred to with like reference numerals.

Figure 1:
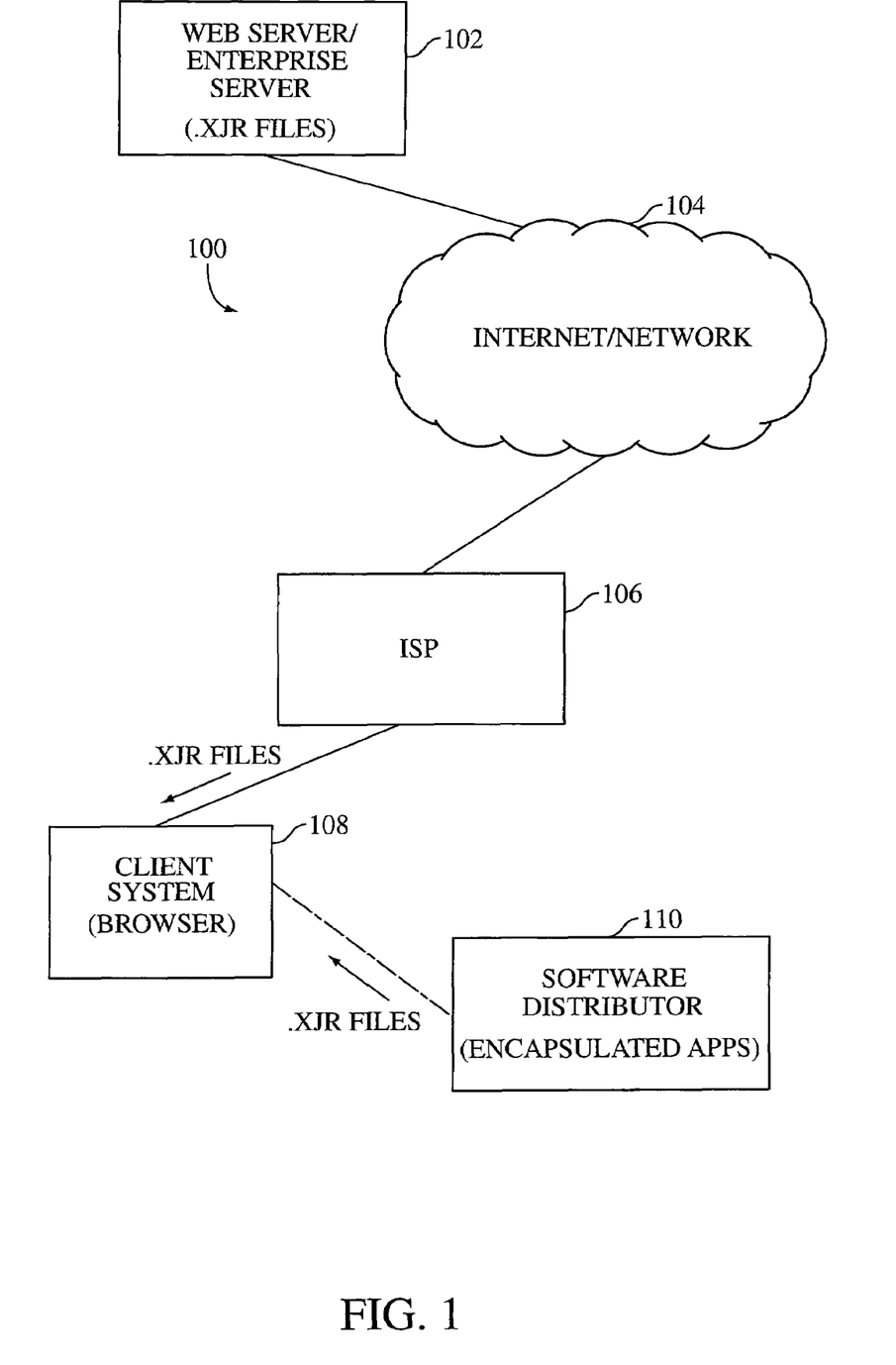
FIG. 1 is a diagram of a system in which a client computing system (e.g., a personal data processing system such as a personal computer) is equipped with a network client (e.g., a world wide web browser software system) which is configured to receive and process a self-contained software package in accordance with a preferred embodiment of the present invention.

Referring now to FIG. 1, depicted therein is a diagram of a system 100 that includes the Internet 104 and/or other networks and wherein a client system equipped with a network client software package (e.g., a world-wide-web browser, etc.) may receive and process self-contained software packages in accordance with the present invention. In particular, system 100 includes a web server system 102 such as one equipped with a web server software system similar or like the NETSCAPE ENTERPRISE SERVER which is manufactured and marketed by NETSCAPE COMMUNICATIONS, INC. System 100 also includes the Internet 104 or other networks such as an intranet, etc. In the context of the present invention, a network is a collection of automatic data processing systems which are coupled together via data communications links. System 100 further includes an ISP 106 (Internet Service Provider) that is capable of allowing user systems to access Internet 104 via modem facilities, ISDN facilities, leased data communications links, etc. Coupled to ISP 106 is client system 108 which is equipped, in accordance with the present invention, with a browser software system which is configured to receive self-contained software packages.

It should be noted that there is no requirement that ISP 108 be present in the context of the present invention. For example, if network 104 is an Intranet or other private/self-contained network, there is no need to provide for network access to outside users, etc. that may otherwise be remotely connected to network resources and who may require dial-up connections, etc.

In system 100, a software distributor 110 is shown as being coupled to client system 108 via a dashed line. The dashed line in system 100 is meant to indicate that the coupling thereof may be an electronic data communications coupling, or one that allows a client system owner and/operator to acquire an executable, encapsulated software application (e.g., web-based application, etc.) in accordance with the present invention such as via other means such as through retail channels, etc.

Figure 2:
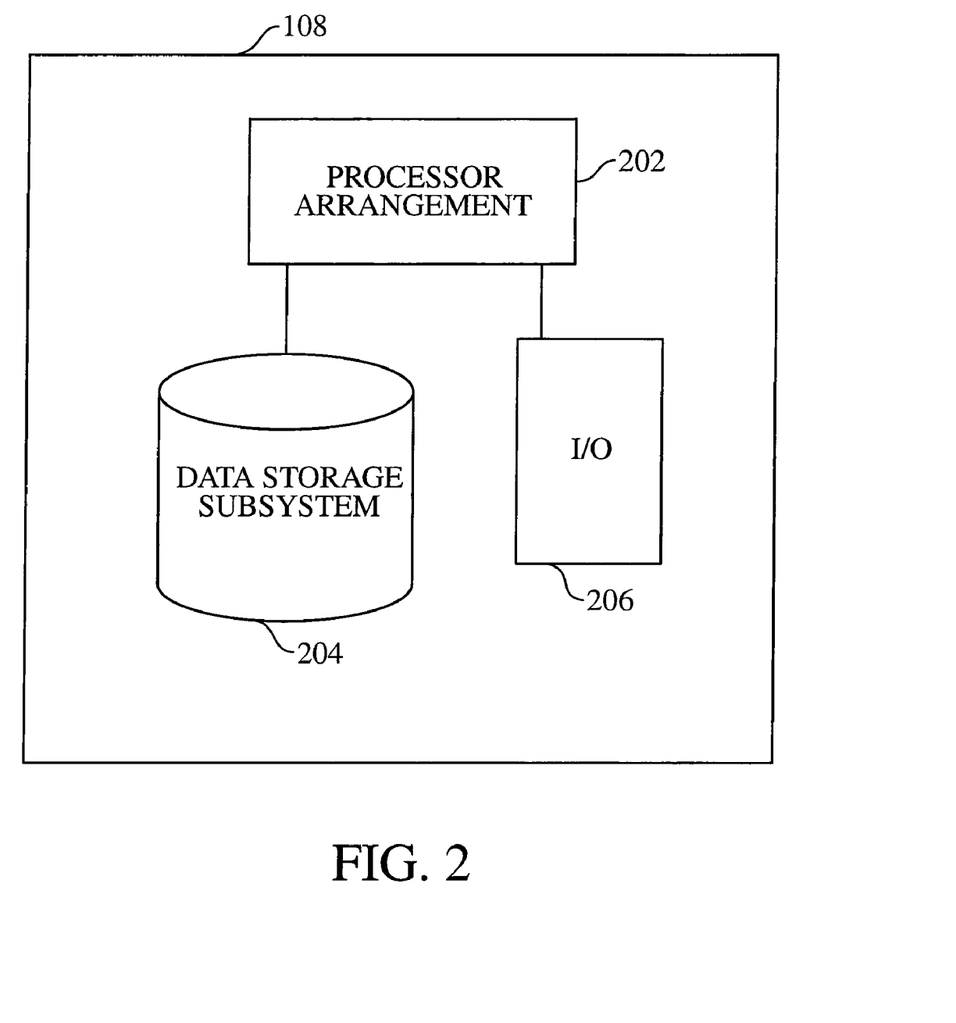
FIG. 2 is a block diagram of the client computing system depicted in FIG. 1.

Referring now to FIG. 2, depicted therein is an exemplary arrangement of client system 108 as originally depicted in FIG. 1. In particular, client system 108 is a personal automatic data processing system such as one similar or like a personal computer manufactured and marketed by IBM CORPORATION and which includes a processor arrangement 202 of one or more processing elements, a data storage subsystem 204, and an I/O subsystem 206 to allow network communications, etc. Data storage subsystem 204 may be configured with a disk array to allow software packages to be loaded thereon and loaded into appropriate memory systems for execution by processor arrangement 202. Furthermore, client system 108 is configured to operate, in accordance with the present invention, a network client such as a world wide web (WWW) browser software package that is further configured to receive encapsulated, self-contained executable software modules which may control the browser environment.

In regard to FIGS. 1 and 2, a self-contained executable software package that may be distributed to client system 108 has been developed. Such a self-contained, executable software package may be used to wrap up web pages, scripts, images, sound files, JAVA, etc. into a self-contained unit for processing within a browser software environment in accordance with the present invention. With such a self-contained unit, one could e-mail the executable package (or a link to it, etc.) to people and it would run automatically within a browser environment as provided by the present invention. An enterprise technology department could update the self-contained unit onto all of their employee's machines, for example, such as for mission critical internal web applications thus saving repeated downloads and resources. Moreover, a sales person could take a slide presentation on the road, or distribute the same without having to worry about losing pages or images during other archiving processes. Sales people could even pack an entire web site or Visual JAVAscript project, etc., and take it on the road. The same would run without having to install a server software system to run the same on a laptop computer, for example, Thus, in order to make more powerful web based applications, the present invention provides a convenient way for Visual JAVAscript and tools like it or similar to it to create a single file that is self-contained with everything needed to run a web based application (e.g., a web site). Accordingly, the present invention provides what may be referred to as a .XJR file. An .XJR file, in accordance with the present invention, uses the standard .JAR file format as proposed by NETSCAPE COMMUNICATIONS INC. and SUN MICROSYSTEMS, INC., with the extension change from .JAR to .XJR for "executable .JAR". The .XJR file format allows for a new mime type (e.g., like or similar to "applications/crossware-app", etc.). The .XJR file, however, has some special headers in its manifest file. Manifest files will be immediately understood by those skilled in the art as they relate to .JAR type files. For example, the initial page or file (e.g., HTML file) to use when loading an encapsulated web application into an equipped browser is identified, in accordance with the present invention, in a manifest file associated with an archive containing all content necessary for a particular web application. The content (e.g., initial content—HTML—may also be included directly in the .XJR provided by the present invention). Additionally, an .XJR file manifest contains a new archive type identifier such as "WebApp" to indicate that the associated archive (.XJR archive) is a web based application such as one that corresponds to a web site, etc. (e.g., one having HTML and other types of content).

The creation of an .XJR file in accordance with the present invention will be similar to the creation of .JAR type files and archives as is well known in the art. It is the present invention's addition of initial content identifiers, etc. (e.g., the inclusion of an initial content source like or similar to an initial HTML file) that allows .XJR files to be created and processed by a browser (web browser, etc.) that is equipped to handle and process the same.

Figure 3:
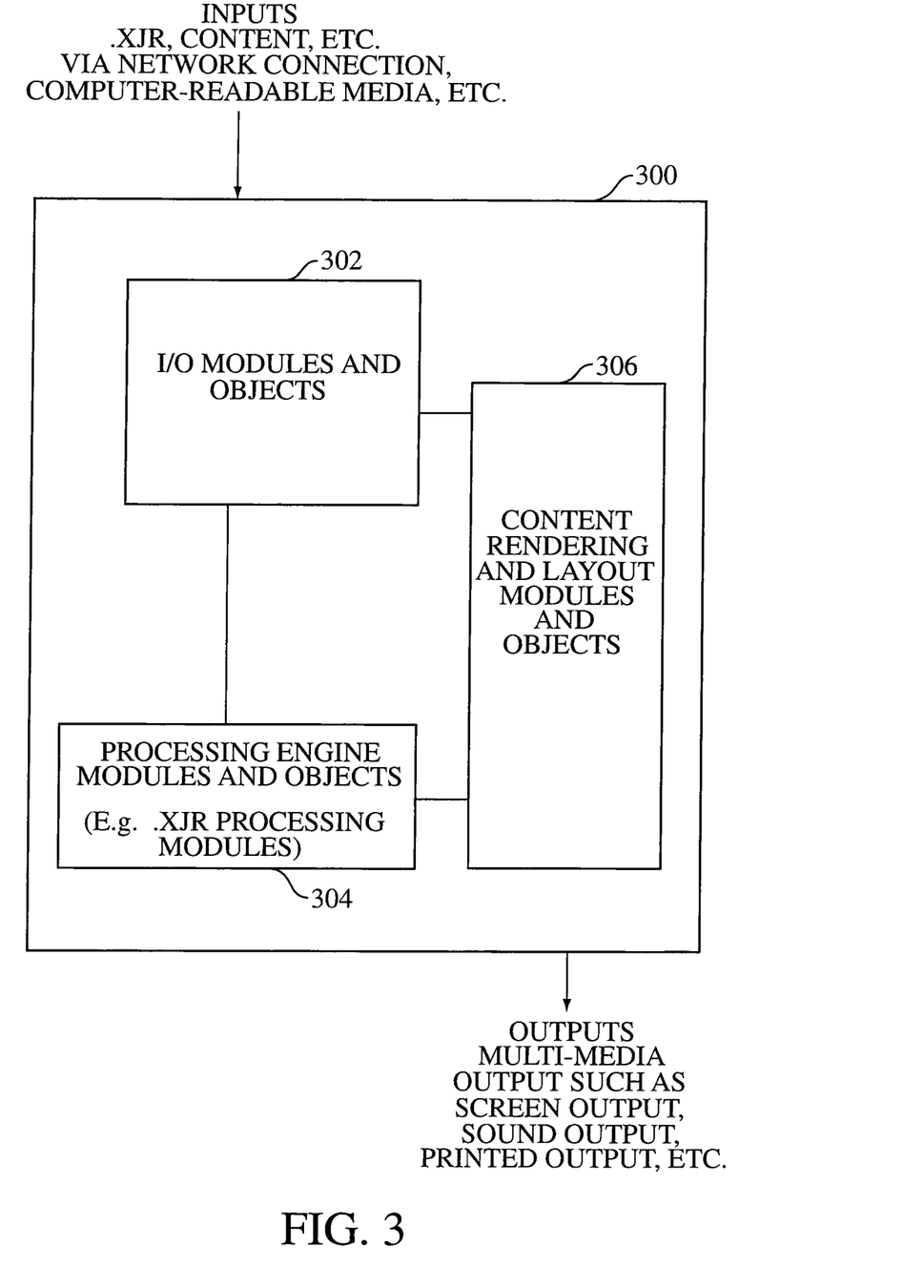
FIG. 3 is a block diagram of a exemplary software system arranged and configured as a network client such as a web browser configured to be operated within the client computing system depicted in FIG. 2 and which is enabled to receive and process a self-contained software package in accordance with a preferred embodiment of the present invention.

Referring now to FIG. 3, depicted therein is a block diagram of a software system arranged and configured as a network client such as a WWW browser software system. In particular, network client 300 includes I/O modules to facilitate input and output of content and other data, a processing engine 304 to facilitate control of the other software modules and components within network client 300, and a rendering and layout engine to facilitate multimedia output such as screen output, sound output, printed output, etc. It is important to note that network client 300 and the block diagram depicted in FIG. 3 illustrates exemplary structures which would be found within a browser environment and, according to the present invention, one that is configured to receive self-contained software packages which may be loaded into processing engine 304 to facilitate a feature set related to a particular web based application. Such a self-contained application will come in the form of an .XJR file or equivalent thereof received via a network connection, a computer readable media such as a compact disc, etc. Processing engine 304 is configured with modules and objects to facilitate processing of .XJR and equivalent files in accordance with the present invention.

Figure 4:
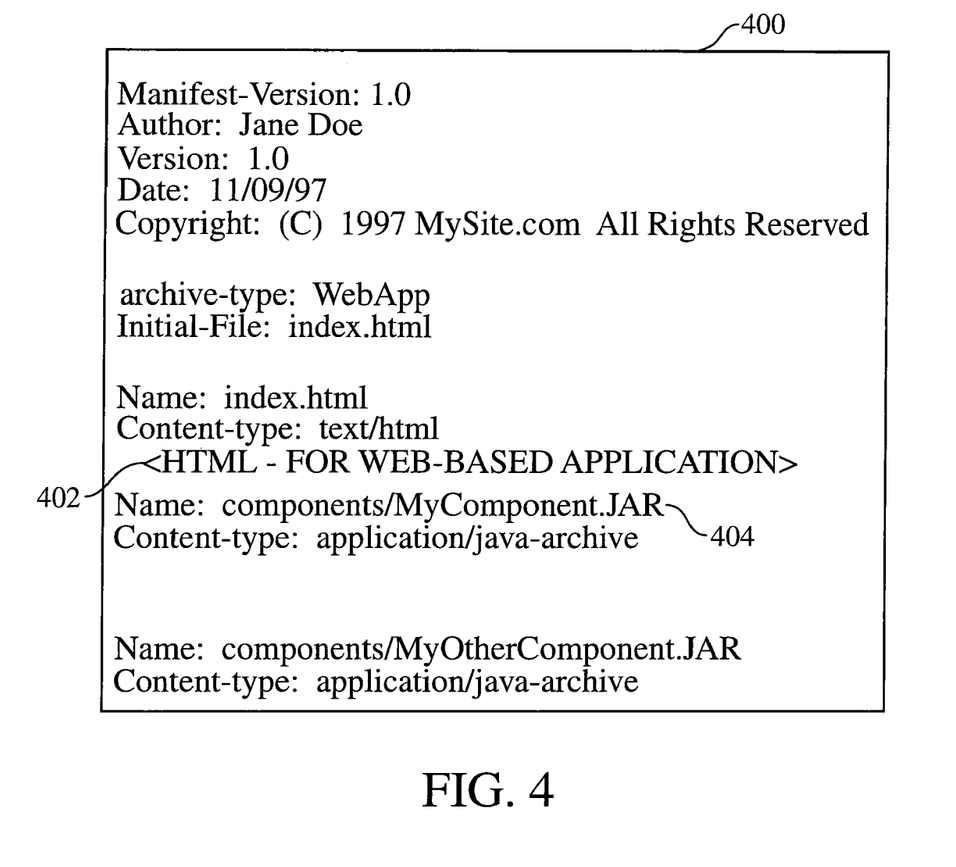
FIG. 4 is a programmatic listing of a manifest file associated with a self-contained software package (e.g., archive, etc.) provided in accordance with a preferred embodiment of the present invention.

Accordingly, with reference to FIG. 4, depicted therein is a manifest file 400 which is associated with an .XJR file and a related archive that contains all content related to a self-contained web application (as indicated at the new "archive type" identifier referred to as "WebApp") in accordance with the present invention. Manifest file 400 includes a reference to an object 402 known as "index.html" which contains HTML content corresponding to a web based application as provided by the present invention. Accordingly, the present invention's use of a .JAR type file structure (archive) and manifest file to allow identification of web application components now allows web developers to facilitate the distribution of self-contained, executable software applications (web sites, web applications, etc.) to users to run the same within appropriately equipped web browser environments such as one similar or like that which is depicted in FIG. 3. By using a standard file structure like the .JAR file structure which has now been renamed in accordance with the present invention as an .XJR for "executable .JAR" file, web developers may now distribute open-standards based archives containing whole web applications without the need for server systems that distribute web content and the like. For example, a presentation created using multiple HTML pages, may now be packaged within an archive associated with an appropriate manifest file and distributed via a network, via retail delivery, etc. to users for automatic execution within appropriately equipped browser environments.

Figure 5:
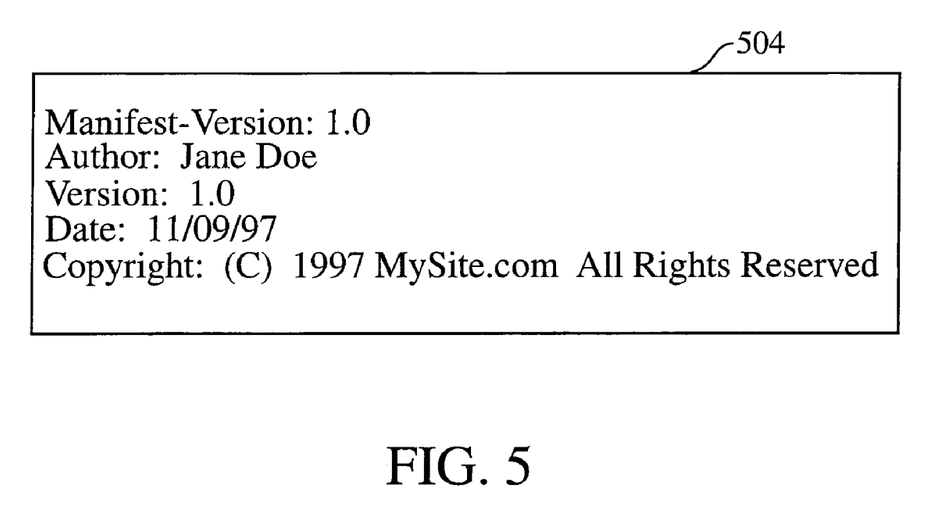
FIG. 5 is a programmatic listing of a manifest file corresponding to an object referenced in the manifest file depicted in FIG. 4.

Referring now to FIG. 5, depicted therein is a manifest file associated with a .JAR file component as identified within manifest 400. Manifest file 504 is a manifest file for the component "mycomponent.jar" which is a JAVA archive. Accordingly, the present invention allows even .JAR files and other types of archive files to be included within an archive containing all content necessary for a web site, or other web application. Accordingly, FIG. 5 clearly illustrates the recursive nature of the present invention to allow self-contained units to contain content formatted in accordance with a standard file format (i.e., .XJRs within .XJRs, etc.).

Figure 6:
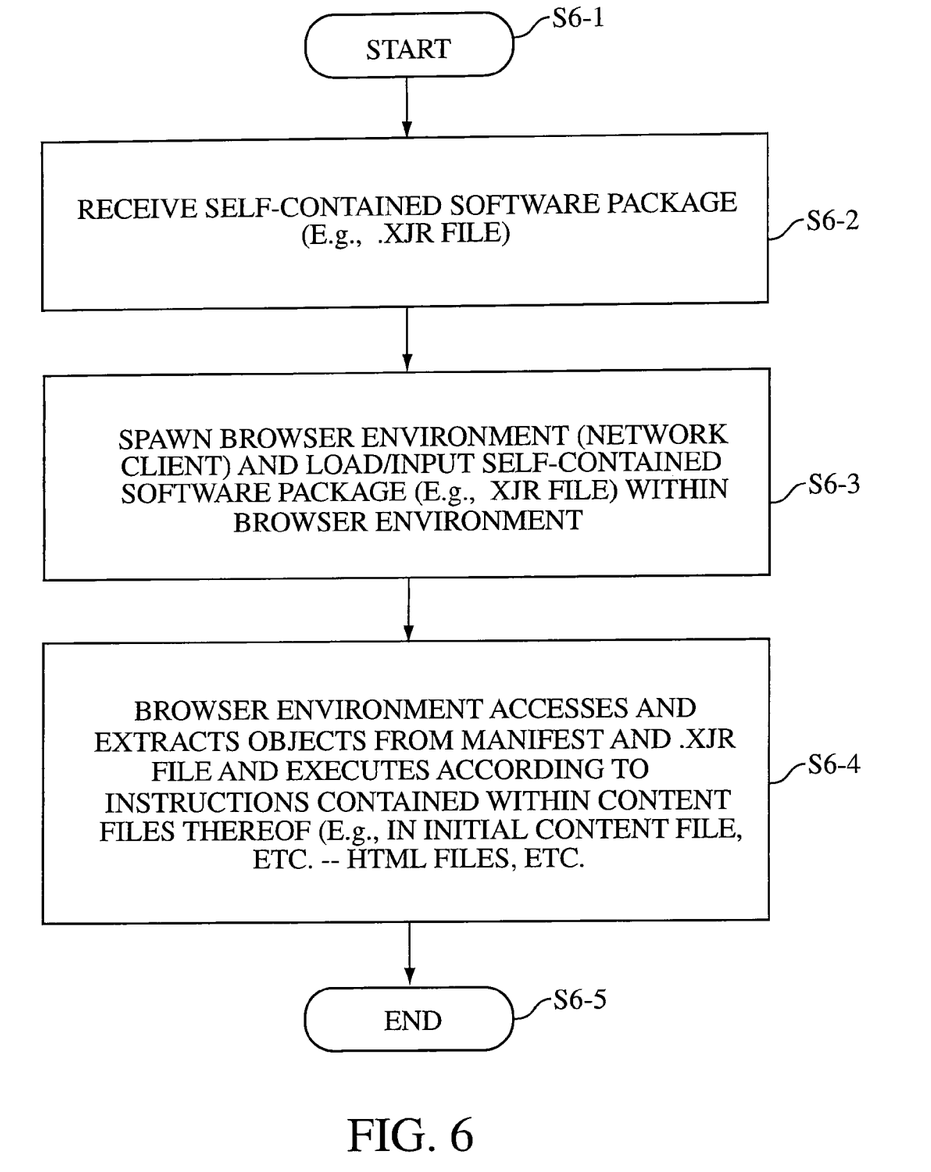
FIG. 6 is a flowchart that illustrates process steps which are performed to allow a network client such as a web browser to receive and process a self-contained software package in accordance with a preferred embodiment of the present invention.

The systems illustrated in FIGS. 1, 2, and 3 and the file formats created in accordance with the present invention as illustrated in FIGS. 4 and 5, are designed to operate together to facilitate the distribution of self-contained web based applications or that content which is executable and processable within a network client environment such as within a WWW browser environment. Accordingly, FIG. 6 illustrates a flowchart that depicts process steps that may be carried out to receive such a self-contained software package and to have the same automatically manifest as a web application within a browser environment. In particular, such process steps commence at step S6-1 and immediately proceeds to step S6-2.

At step S6-2, a self-contained software package in the form of an .XJR file as discussed above with regard to FIGS. 4 and 5, will be received by a client system such as client system 108. Such receipt may be via a network coupling, other data communications coupling, or via distribution via some form of computer readable medium such as via retail distribution of a compact disc, etc.

Next, at step S6-3, if not already done so within a processing environment such as within an operating system (e.g., within the MICROSOFT WINDOWS 95™ or 98™ operating system environments, etc.), a browser or other network client may be spawned and loaded with the self-contained software package (i.e., the .XJR file as already received at step S6-2). The browser environment will then proceed to access the manifest file (e.g., manifest file 400 as depicted in FIG. 4) and proceed to locate all files within an associated archive and to process the same to provide functionality in accordance with instructions and content contained within files and data in the associated archive. That is, the manifest file of the .XJR file may be accessed for a start up file known as "index.html", which contains HTML instructions for controlling a browser environment and rendering or otherwise laying out content in accordance with instructions contained therein. Such instructions may call for the layout and rendering of content including images, text, sound files, etc. All types of content that may be displayed and/or manifested within a web site or web application are contemplated by the present invention.

Next, processing proceeds to step S6-4 where the browser environment accesses an extracts objects from the .XJR file and executes accordingly as discussed above based upon instructions contained within content thereof etc.

Processing ends at step S6-5.

Based on the forgoing discussion, the present invention will allow an entire web application to be packaged as a modern equivalent of an .EXE (executable) file. With the use of an .XJR type file, as provided by the present invention, a browser environment may be spawned and caused to open and access content within a manifest file and an associated archive containing web site, web applications, etc. and other content for display and manifestation by the web browser.

Alternatively, one could associate .XJR files in a WINDOWS type desktop so that they can automatically launch a browser upon instantiation thereof (e.g., via double clicking on an .XJR file icon in accordance with the present invention). Accordingly, applications may be built to run in a browser environment so that they can compete more directly with native machine applications, thus enhancing a browser platform configured and equipped in accordance with the present invention. Accordingly, a browser environment may now be caused to become more of a staple tool much like a word processor, spreadsheet, etc.

Furthermore, because an .XJR file according to the present invention bears the same file structure as a .JAR type file as will be readily understood by those skilled in the art, the same may be signed, thus establishing security credentials quickly and easily across all files within an .XJR file with a single signature thus greatly streamlining the need to sign individual scripts, and other components contained therein.

As a result, the present invention makes a browser type environment a more powerful place to deploy more powerful web applications, such as those built with Visual JAVAscript, etc.

Thus, having fully described the present invention by way of example with reference to the attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. A method for executing an application, the method comprising:

loading a first package within a browser on a local client computer, the first package including a first manifest and a first archive of files that includes instructions and content needed to execute an application, the first archive of files including:
    an initial file that includes instructions for initiating execution of the application, the initial file being a markup language file,
    other files needed to execute the application, and
    a second package that includes a second manifest and a second archive of files, the second package being of the same type as the first package, and the second archive of files being of the same type of file structure as the first archive of files;
the first manifest including an initial file identifier that indicates that the initial file is to be processed before the other files in the first archive of files when the application is executed;
in response to loading the first package within the browser, automatically accessing the first manifest;
locating the initial file identifier in the first manifest;
based on the located initial file identifier, accessing the instructions for initiating the execution of the application from the initial file;
processing the accessed instructions from the initial file; and
automatically initiating execution of the application based on the processed instructions.

2. The method of claim 1, further comprising receiving the first package at the local client computer.

3. The method of claim 2, wherein receiving the first package at the local client computer comprises loading the first package onto the local client computer from a local computer readable medium.

4. The method of claim 2, wherein receiving the first package at the local client computer comprises receiving an e-mail that includes the first package at the local client computer.

5. The method of claim 1, wherein the instructions for initiating execution of the application from the initial file include instructions to process additional instructions from one or more of the other files in the first archive, the method further comprising:
   accessing the additional instructions from the one or more other files; and
   processing the additional instructions, the accessing and processing of the additional instructions being performed in response to processing the instructions for initiating execution of the application from the initial file.

6. The method of claim 1, wherein:
   the initial file comprises a source file for a web page,
   the instructions for initiating execution of the application from the initial file comprise instructions for rendering the web page, and
   automatically initiating execution of the application comprises rendering the web page in accordance with the instructions for rendering the web page.

7. The method of claim 6, wherein the source file for the web page comprises an HTML document.

8. The method of claim 1, wherein:
   the initial file comprises an executable file, and
   the instructions for initiating execution of the application from the initial file comprise program execution instructions.

9. The method of claim 1, wherein:
   the first manifest further comprises an archive type identifier that identifies an application type of the application, and
   processing the accessed instructions comprises processing the accessed instructions in accordance with the application type of the application.

10. The method of claim 1, further comprising displaying an icon associated with the application, wherein loading the first package in the browser comprises automatically loading the first package in the browser in response to a user selecting the icon associated with the application.

11. The method of claim 1, wherein the initial file identifier indicates that the initial file is the first file to be processed in the first archive of files when the application is executed.

12. The method of claim 1, wherein automatically initiating execution of the application based on the processed instructions comprises automatically initiating execution of the application without maintaining a connection between the local client computer and a web server.

13. The method of claim 1, wherein the same type of file structure of the first archive of files and the second archive of files is a JAR type file structure.

14. A computer program product for executing an application, the computer program product being embodied in a tangible computer readable medium and including instructions that, when executed by a processor, cause the processor to:
   load a first package within the computer program product, the first package including a first manifest and a first archive of files that include instructions and content needed to execute the application, the first archive of files including:
      an initial file that includes instructions for initiating execution of the application, the initial file being a markup language file,
      other files needed to execute the application, and
      a second package that includes a second manifest and a second archive of files, the second package being of the same type as the first package, and the second archive of files being of the same type of file structure as the first archive of files;
   the first manifest including an initial file identifier that indicates that the initial file is to be processed before the other files in the first archive of files when the application is executed;
   automatically access the first manifest in response to loading the first package within the computer program product;
   locate the initial file identifier in the first manifest;
   access the instructions for initiating the execution of the application from the initial file based on the located initial file identifier;
   process the accessed instructions from the initial file; and
   automatically initiate execution of the application based on the processed instructions.

15. The computer program product of claim 14, further comprising instructions that, when executed by the processor, cause the processor to receive the first package at a local client computer.

16. The computer program product of claim 15, wherein the instructions that, when executed by the processor, cause the processor to receive the first package at the local client computer comprise instructions that, when executed by the processor, cause the processor to load the first package onto the local client computer from a local computer readable medium.

17. The computer program product of claim 14, wherein the instructions for initiating the execution of the application from the initial file include instructions to process additional instructions from one or more of the other files in the first archive, the computer program product further comprising instructions that, when executed by the processor, cause the processor to:
   access and process the additional instructions from the one or more other files in response to processing the instructions for initiating execution of the application from the initial file.

18. The computer program product of claim 14, wherein:
   the initial file comprises a source file for a web page,
   the instructions for initiating execution of the application from the initial file comprise instructions for rendering the web page, and
   the instructions that, when executed by the processor, cause the processor to automatically initiate execution of the application comprises instructions that, when executed by the processor, cause the processor to render the web page in accordance with the instructions for rendering the web page.

19. The computer program product of claim 18 wherein the source file for the web page comprises an HTML document.

20. The computer program product of claim 14, wherein:
   the initial file comprises an executable file, and
   the instructions for initiating execution of the application from the initial file comprise program execution instructions.

21. The computer program product of claim 20, wherein:
   the first manifest further comprises an archive type identifier that identifies an application type of the application, and
   the instructions that, when executed by the processor, cause the processor to process the accessed instructions comprise instructions that, when accessed by the processor, cause the processor to process the accessed instructions in accordance with the application type of the application.

22. The computer program product of claim 14 further comprising instructions that, when executed by a processor, cause the processor to display an icon associated with the application, wherein the instructions that, when executed by the processor, cause the processor to load the first package in the computer program product comprise instructions that, when executed by the processor, cause the processor to automatically load the first package in the computer program product in response to a user selecting the icon associated with the application.

23. The computer program product of claim 14, wherein the computer program product comprises a browser.

24. The computer program product of claim 14, wherein the initial file identifier indicates that the initial file is the first file to be processed in the first archive of files when the application is executed.

25. The computer program product of claim 14, wherein the instructions that, when executed by the processor, cause the processor to automatically initiate execution of the application based on the processed instructions comprise instructions that, when executed by the processor, cause the processor to automatically initiate execution of the application without maintaining a connection between a local client computer and a web server.

26. The computer program product of claim 14, wherein the same type of file structure of the first archive of files and the second archive of files is a JAR type file structure.

27. A method for generating a first package such that an application may be automatically executed by a browser on a client computer, the method comprising:
    generating a first archive of files that include instructions and content needed to execute the application, the first archive including:
        an initial file that includes instructions for initiating execution of the application, the initial file being a markup language file,
        other files needed to execute the application, and
        a second package that includes a second manifest and a second archive of files, the second package being of the same type as the first package, and the second archive of files being of the same type of file structure as the first archive of files;
    generating a first manifest file that is associated with the first archive, the first manifest file including an initial file identifier that instructs the browser to process the initial file before processing other files in the first archive in order to initiate execution of the application; and
    encapsulating the first archive of files and the first manifest file within the first package.

28. The method of claim 27, wherein the instructions for initiating execution of the application from the initial file include instructions to process additional instructions from one or more of the other files in the first archive.

29. The method of claim 27, wherein:
    the initial file comprises a source file for a web page, and
    the instructions for initiating execution of the application from the initial file comprise instructions for rendering the web page.

30. The method of claim 29, wherein the source file for the web page comprises an HTML document.

31. The method of claim 27, wherein:
    the initial file comprises an executable file, and
    the instructions for initiating execution of the application from the initial file comprise program execution instructions.

32. The method of claim 27, wherein:
    the first manifest file further comprises an archive type identifier that instructs the browser to process the instructions for initiating execution of the application from the initial file in accordance with the application type of the application.

33. The method of claim 27 further comprising, establishing security credentials for the initial file, the other files needed to execute the application, and the second archive using a single signature for the first package.

34. The method of claim 27, wherein the same type of file structure of the first archive of files and the second archive of files is a JAR type file structure.

35. A self-contained package, the self-contained package being embodied in a tangible computer readable medium and configured to enable an application to be automatically executed within a browser environment, the self-contained package comprising:
    a first archive including:
        an initial content source having instructions for initiating execution of the application within the browser environment, the initial content source being a markup language file,
        additional files that include instructions and content needed to execute the application within the browser environment, and
        a second package that includes a second manifest and a second archive of files, the second package being of the same type as the first package, and the second archive of files being of the same type of file structure as the first archive of files; and
    a first manifest associated with the first archive that includes an initial content identifier that indicates that the initial content source is to be processed before the additional files in the first archive when the application is executed.

36. The self-contained package according to claim 35, wherein said initial content source is an HTML file containing content layout instructions for rendering a document that displays content included in the first archive.

37. The self-contained package according to claim 35, wherein said initial content source is an executable file containing program execution instructions.

38. The self-contained package of claim 37, wherein the first manifest further comprises an archive type identifier that identifies an application type of the application.

39. The self-contained package of claim 35, wherein the additional files comprise one or more of a web page, a script, an image, a sound file, and a JAVA file.

40. The self-contained package according to claim 35, wherein the same type of file structure of the first archive of files and the second archive of files is a JAR type file structure.

41. A method for executing an application, the method comprising:
    loading, within a processing environment on a local client computer, a first package that includes a first manifest and a first archive of files, wherein:
        the first manifest includes a first initial file identifier that identifies a particular file from within the first archive of files as a first initial file that is to be processed before other files in the first archive of files when the application is executed, and the first archive of files includes:
> the first initial file, the first initial file including instructions for initiating execution of the application, the first initial file being a markup language file,
> other files needed to execute the application, and a second package, the second package including:
> a second manifest that includes a second initial file identifier that identifies a particular file from within a second archive of files as a second initial file that is to be processed before other files in the second archive of files when the application is executed, and
> the second archive of files that includes:
> > the second initial file, the second initial file including instructions for executing the application, the second initial file being a markup language file, and
> > additional files needed to execute the application;

in response to loading the first package within the processing environment, automatically access the first manifest;
locating the first initial file identifier in the first manifest;
based on the located first initial file identifier, accessing the instructions for initiating execution of the application from the first initial file;
processing the accessed instructions from the first initial file; and
automatically initiating execution of the application based on the processed instructions from the first initial file.

42. The method of claim 41 further comprising:
accessing the second manifest after locating the first initial file identifier in the first;
locating the second initial file identifier in the second manifest;
based on the located second initial file identifier, accessing the instructions for executing the application from the second initial file;
processing the accessed instructions from the second initial file; and
executing the application based on the processed instructions from the second initial file.

* * * * *